Patented Sept. 8, 1953

2,651,648

UNITED STATES PATENT OFFICE 2,651,648

COPPER DIAMMONIUM PENTACHLOROPHENOLATE

Frederick J. Meyer, Freeland, Mich., assignor to The Dow Chemical Company, Midland, Mich., a corporation of Delaware No Drawing. Application July 12, 1950, Serial No. 173,479

1 Claim. (Cl. 260—438)

This invention relates to copper pentachlorophenolate ammonia complexes and is particularly directed to a copper diammonium pentachlorophenolate. This compound has been prepared and identified. It is soluble in cyclohexanone, methyl normalamyl ketone, Carbitol, and butyl Carbitol, and substantially insoluble in water, ethylene dichloride, and chlorobenzene. The compound is of value as an inhibitor of mildew and rot when applied to cotton textiles, wood, and other cellulosic structures.

In the preparation of the new compound, a water-soluble salt of pentachlorophenol is dissolved in water and the resulting solution reacted with a water-soluble cupric salt. The copper pentachlorophenolate is separated and reacted with ammonia in the presence of isopropyl alcohol. The conditions and steps of reaction appear to be somewhat critical if the compound of the invention is to be obtained.

In a representative preparation, commercial grade pentachlorophenol was purified by recrystallization from trichloroethylene to obtain substantially pure pentachlorophenol as white crystals melting at 188°–190° C. 40 grams of this compound was dissolved in N/1 aqueous sodium hydroxide to obtain a sodium phenolate solution having reaction of pH 10. 18.7 grams of $CuSO_4 \cdot 5H_2O$ was dissolved in 3 liters of water and added portionwise and with stirring over a period of several minutes to the aqueous phenolate solution. A precipitate formed immediately. The resulting slurry was stirred at room temperature for 15 hours, thereafter filtered, and the precipitate washed several times with distilled water. These washings were accomplished by ball-milling the lumpy precipitate with the water and thereafter removing the water by filtration. The washed copper pentachlorophenolate was air-dried for 4 days to obtain 33.5 grams of the desired compound.

25 parts by weight of the air-dried copper pentachlorophenolate as obtained above was slurried with 58 parts of isopropyl alcohol. A solution of 58 parts by weight of 28 per cent aqueous ammonia and 50 parts of water was then added portionwise and with stirring to the slurry. The dispersed copper pentachlorophenolate did not immediately dissolve, so an additional 30 parts by weight each of 28 per cent aqueous ammonia and isopropyl alcohol were added to the mixture, and the latter warmed to 85° C. on a water bath with stirring. The resulting clear dark blue solution was placed in a crystallizing vessel and evaporated to dryness to obtain the desired copper diammonium pentachlorophenolate as a dark red crystalline compound having the following composition by analysis:

| | Found | Theoretical |
|---|---|---|
| Percent chlorine | 55.38 | 56.4 |
| Percent copper | 10.50 | 10.1 |
| Percent nitrogen as $NH_3$ | 5.36 | 5.4 |
| Percent $SO_4$ | 0.02 | |

From this analysis it was determined that the composition was 98.1 per cent copper diammonium pentachlorophenolate of the formula $Cu(NH_3)_2(C_6Cl_5O)_2$. This material had a bulk density of 1.131, started to melt at 203.8° C., formed a meniscus in the melting point tube at 210° C. and thereafter underwent partial decomposition.

In a further preparation the wet precipitate of copper pentachlorophenolate was reacted with ammonia. In this operation 13.3 parts by weight of pentachlorophenol was dissolved in a solution of 2.0 parts of sodium hydroxide in 50 parts of water. A solution of 6.25 parts of $CuSO_4 \cdot 5H_2O$ in 50 parts of water was added to the sodium pentachlorophenolate solution. The resulting slurry was dispersed in 100 parts by weight of water and filtered to obtain a wet filter cake of copper pentachlorophenolate. This product was dispersed without drying in 30 parts by weight of isopropyl alcohol and 30 parts of 28 per cent ammonium hydroxide, and about an equal volume of water added with stirring to the isopropyl alcohol dispersion. The mixture was stirred for a short time to accomplish the solution of the solid constituents. The resulting dark blue solution was evaporated to dryness to obtain a copper ammonia complex similar to that described above and in the form of dark red crystals. Analysis of this product indicated it to be in excess of 96 per cent by weight of copper diammonium pentachlorophenolate.

I claim:

Copper diammonium pentachlorophenolate having the formula $Cu(NH_3)_2(C_6Cl_5O)_2$.

FREDERICK J. MEYER.

References Cited in the file of this patent

UNITED STATES PATENTS

| Number | Name | Date |
|---|---|---|
| 2,209,970 | Hay | Aug. 6, 1940 |
| 2,327,338 | Carswell | Aug. 24, 1943 |
| 2,430,017 | Houk | Nov. 4, 1947 |

FOREIGN PATENTS

| Number | Country | Date |
|---|---|---|
| 356,192 | Great Britain | Aug. 27, 1931 |